(12) United States Patent
Mount et al.

(10) Patent No.: US 7,437,594 B1
(45) Date of Patent: Oct. 14, 2008

(54) SERVER-SIDE SESSION MANAGEMENT

(75) Inventors: George Mount, Mountain View, CA (US); Ramachandra Srivatsa, Sunnyvale, CA (US)

(73) Assignee: America Online, Inc., Dulles, VA (US)

( * ) Notice: Subject to any disclaimer, the term of this patent is extended or adjusted under 35 U.S.C. 154(b) by 434 days.

(21) Appl. No.: 10/343,160

(22) PCT Filed: Aug. 11, 2000

(86) PCT No.: PCT/US00/22216

§ 371 (c)(1),
(2), (4) Date: Jan. 23, 2003

(87) PCT Pub. No.: WO02/15526

PCT Pub. Date: Feb. 21, 2002

(51) Int. Cl.
*G06F 11/00* (2006.01)

(52) U.S. Cl. ............... 714/4; 714/11; 709/224

(58) Field of Classification Search ........ 714/4, 714/11
See application file for complete search history.

(56) References Cited

U.S. PATENT DOCUMENTS

| | | | | |
|---|---|---|---|---|
| 5,155,678 | A | 10/1992 | Fukumoto et al. | 395/425 |
| 5,652,908 | A | 7/1997 | Douglas et al. | 395/800 |
| 5,796,934 | A | 8/1998 | Bhanot et al. | 395/182.02 |
| 5,938,732 | A * | 8/1999 | Lim et al. | 709/229 |
| 5,951,694 | A * | 9/1999 | Choquier et al. | 714/15 |
| 6,058,424 | A * | 5/2000 | Dixon et al. | 709/226 |
| 6,076,108 | A | 6/2000 | Courts et al. | 709/227 |
| 6,438,705 | B1 * | 8/2002 | Chao et al. | 714/4 |
| 6,539,494 | B1 * | 3/2003 | Abramson et al. | 714/4 |
| 6,560,717 | B1 * | 5/2003 | Scott et al. | 714/4 |
| 6,609,213 | B1 * | 8/2003 | Nguyen et al. | 714/4 |
| 6,859,834 | B1 * | 2/2005 | Arora et al. | 709/227 |
| 6,947,982 | B1 * | 9/2005 | McGann et al. | 709/224 |

* cited by examiner

*Primary Examiner*—Yolanda L Wilson
(74) *Attorney, Agent, or Firm*—Michael A. Glenn; Glenn Patent Group

(57) ABSTRACT

The invention relates to the backup of a user session on a network. When the user at a client, such as an ISP, makes a request on the network, this request is routed by a load balancer to a primary host server on the network. The selection of the server is done by the load balancer in such a manner as to distribute the load on the system evenly and prevent overloading of one particular server. Once the user request has been routed, user specific information such as a session identification code or a password is provided to the primary host server and the session is set up. A single session must comprise of at least one application process on the selected primary host server. On commencement of the session, the load balancer designates at least one other server on the network to act as primary backup server for the user session set up on the primary host server. The primary backup server stores session information from the primary host server and in case of a server breakdown, the backup server takes over as the primary server. The load balancer then configures another server to act as backup server for this new primary server. According to the invention, the backup function of the servers is equitably distributed across servers so as to ensure that no one server is excessively burdened with the backup functions.

8 Claims, 2 Drawing Sheets

SERVER-SIDE SESSION MANAGEMENT

BACKGROUND OF THE INVENTION

1. Technical Field

The invention relates to server side session management. A session is defined as the information that the user provides to the host server using any browser for the purpose of carrying out a sequence of related online transactions. More particularly, the invention relates to maintaining easily retrievable backups of a user session in a scalable and performant way on the network so as to continue managing a session even during server failures at web-hosting sites.

2. Description of the Prior Art

Internet usage has exploded over the years and is becoming more and more popular by the day. There has also been a phenomenal increase in inline shopping; i.e. e-commerce, with statistics showing that in 1999 there were more online shoppers than all the shoppers in the prior three years put together.

An on-line shopping transaction, which is one of the most significant applications of session management, comprises a number of steps. The purchaser/online shopper begins by visiting multiple sites for research. Then the shopper chooses a particular web site and then within the web site parses through various web pages (links) to narrow down on the particular product. The process ends with the completion of the sales transaction through the input of relevant information required from the purchaser for the purpose.

In this context, session management assumes great significance. In carrying out an on-line transaction, such as a purchase, it is important that the information submitted by the user during the course of an on-line session be stored and be easily retrievable in case of server break down. Thus, a need exists for backing up information and data on a user session, so that the session information does not get lost in case of a server break down, thus not requiring the user to restart the session all over again.

Although duration of a typical session lasts only from a few minutes to hours, the growing number of Internet users has dramatically increased the number of sessions taking place per second. Therefore, a need exists for robust session management methods on the server side to handle the ever-increasing number of sessions and make the overall online experience a pleasant one for the user. Good session management is important because performance is critical.

Good session management involves inter alia restoring the session to the state it was in prior to the failure of the server, thereby not requiring the user to restart the session all over again in case of a server breakdown. There are two main types of session management. One is client side session management and the other is server side session management.

Client Side
1. Session management with cookies
2. Session management using invariable time forms Server Side
1. Session management methods on the server side.

Session management using cookies involves leaving a cookie (block of data) on the PC of the user. This cookie contains information such as the session history, personal information about the user like user name and shopping cart, and any other pertinent information. In the event of disruption of the session due to any reason, such as server failure, the information is stored only in the cookie and the session continues without failure.

Session management using hidden variable within forms involves storing all the information input by the user and transmitting that information also as the user moves from one page to the next. The next form contains the same information input by the user in the first form.

Server side session management methods, broadly speaking, involve storing data about a user session on the network server with which the user is in contact, such a server performing the task of constantly updating and maintaining recent session information. The process begins with the input of data by the user to the server. The server keeps track of the information and maintains cached copy of session data retrievable for each continuing request. At the same time, such a method proves to be less taxing on the network bandwidth, because the session data does not need to be passed on every request.

Server side session management systems need to be robust, performant and scalable, so as to better address the needs of users and be a reliable system of backup. The backup strategy needs to be efficient so as to come into play immediately on the failure of the primary server so that information about the session gets transmitted to the backup server, which immediately assumes the functions hitherto performed by the primary server that just failed. The speed at which these transactions occur is important so that the user does not experience any discontinuity or disruption, thus ensuring the overall satisfaction of the session for the end user.

There are several methods of server side session management. According to a traditional method of server side session backup, session information from all the different servers on a network are backed up in the database directly.

Netscape Enterprise Server 4.0 (NES), manufactured by Netscape Communications Corporation of Mountain View, Calif. has a server side session management mechanism for session backup on a single machine called the MMapSessionManager. In this implementation each server writes session information to a common file, maintained by MMapSessionManager. Under this implementation, if one of the servers fails, other servers can access the information of the failed server from the Session Manager and thus restore the session seamlessly. Each server is a peer and can handle a request from any user equally.

The main disadvantages to this kind of a system of session management are in the areas of file storage, a single point of failure and scalability. Performance of a session is critical, such performance being dependent upon the session information files being stored locally so that retrieval may be faster. Although, storing of session backups locally makes retrieval faster and performance efficient, storing of all the files locally on one machine, i.e the MmapSessionManager means that there is a single point of failure. As a result the system is ill equipped to overcome an eventuality where the hardware holding the Session information fails. In such a situation, the entire session information, which was backed up by the Sessions Manager is lost forever with no way to retrieve it whatsoever.

Even in cases where files are stored in a remote file server because efficient or speedy performance is not a critical issue, the system still has a single point of failure as discussed earlier, meaning thereby that if the storage server hardware fails, the session data thus lost becomes irretrievable.

Netscape Application Server (NAS) has a different implementation of safe server-side session management. ANAS is an application server and therefore has numerous functionalities such as database access across servers. Server-side session management is an important feature of NAS.

Under NAS, when a user conducts a session with a particular server, all session information is backed up synchronously with both a Master instance as well as a Slave instance. The server conducting the session is given a token to update the session information. If any other server needs to update the session, then the token must be transferred from the owner to the other server through the Master instance.

When the server conducting the session fails, the user is routed to another server, which attempts to attain the token through the Master instance. The Master instance detects that the server which owned the token has failed and grants a new token to the server now conducting the user's session.

Safe server-side session management on NAS is not performant. During updates to the session, the data must be written to the Master instance which in turn updates the Slave, all of which must be done before responding to the user.

Scalability also suffers greatly, because there are only two servers responsible for session backup. The load cannot be distributed among more servers as the number of servers on the network grows.

Hence, it is evident that a need exists for a mechanism of session management that includes failover servers to take over the load of the failed primary server without compromising speed and performance. Such a system should be scalable so as to meet the growing demands of the e-commerce community. Further, a need exists for a system of session management, which is performant

SUMMARY OF THE INVENTION

The current invention relates to a scalable and performant backup method for server-side sessions. When a user first visits a web site, he is routed by a load balancer to a primary server which will take the responsibility to service his requests. The server sets up a session for that user and returns an identifier to the user's browser. The session manager sets up a backup server for the user's session based on the identifier. All information written to the primary server's session is sent to the backup as well. In case the primary server fails, the load balancer follows the same algorithm as the session manager to assign the backup server as the new primary server. The new primary server then designates new backup server(s) which take on the responsibility for backing up the session. According to the present invention, the backup function of the servers is equitably distributed across servers so as to ensure that no one server is excessively burdened with the backup functions.

DETAILED DESCRIPTION OF THE INVENTION

The invention uses a new and unique method of server-side session management, wherein each web server is equally given the task of backing up sessions from each other web server.

Figure 1:
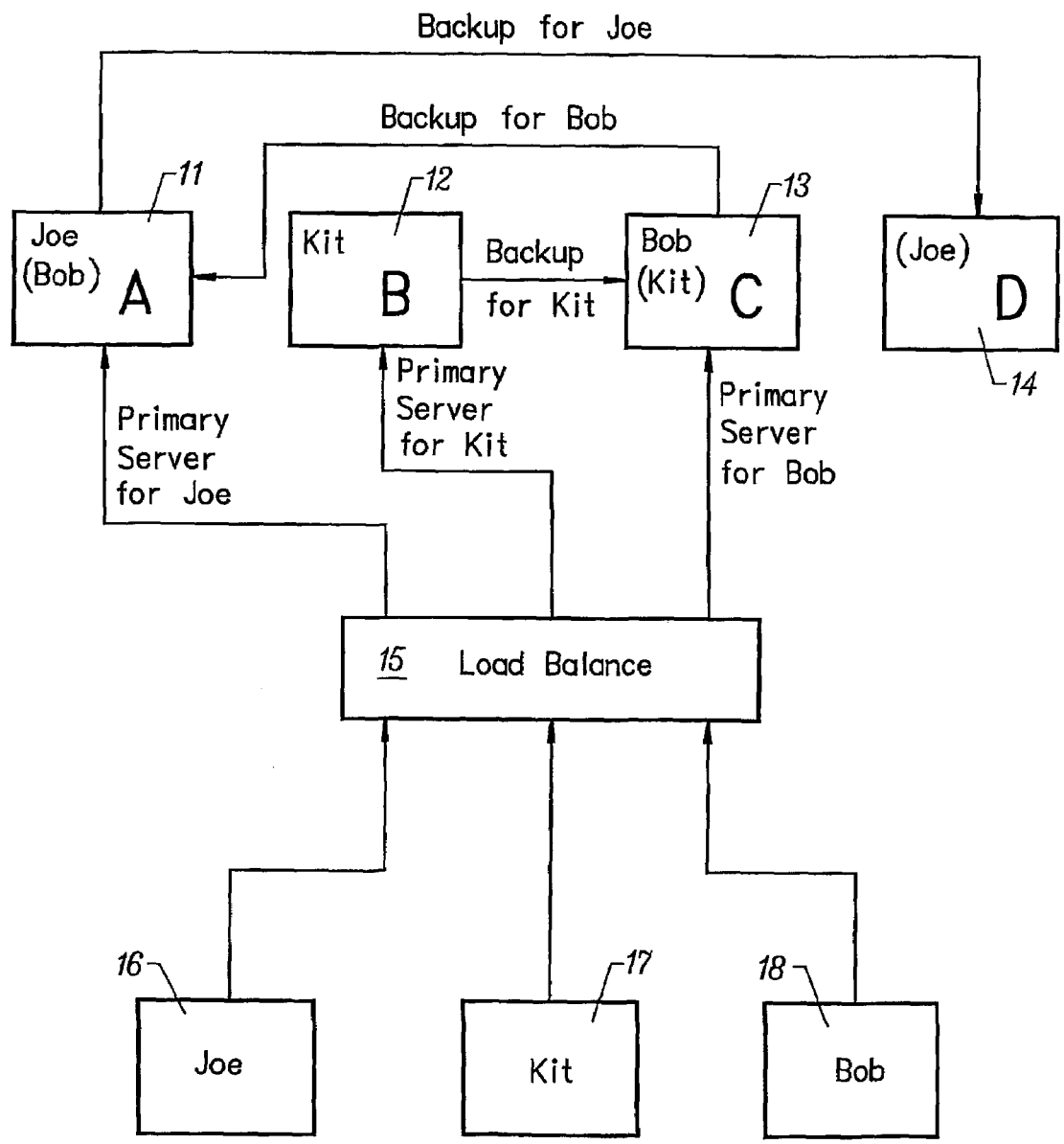
FIG. 1 is a schematic representation of a server side session management system using a load balancer depicting the takeover mechanism.

FIG. 1 is a schematic diagram, which provides a general overview of how a session is set up and handled by the server-side management system, using a load balancer.

According to a preferred embodiment of this invention, on-line users Joe (16), Kit (17), and Bob (18) login to the site from their respective computers onto a network with four servers A-D. Joe (16), Kit (17), and Bob (18) are routed by the load balancer to a particular server. The load balancer will continue to send all requests from Joe (16) to the same server A (11) until that server fails or the session ends. Similarly, the load balancer will continue to send all requests from Kit (17) to the same server B (12) until that server fails or the session ends. Finally, the load balancer chose server C (13) to service Bob's (18) requests.

When Joe (16) first visits the web site, server A (11) creates a session for him with the identifier 1234. According to the session management algorithm, the backup machine for session 1234 is designated as server D (14). All data that Joe (16) sends to server A that needs to be stored in the session is copied to server D (14).

When Kit (17) first visits the web site, server B (12) creates a session for him with the identifier 5678. According to the session management algorithm, the backup machine for session 5678 is designated as server C (13). All data that Kit (17) sends to server B (12) that needs to be stored in the session is copied to server C (13).

When Bob (18) first visits the web site, server C (13) creates a session for him with the identifier 9012. According to the session management algorithm, the backup machine for session 9012 is designated as server A (11). All data that Bob (18) sends to server A that needs to be stored in the session is copied to server A (11).

According to the preferred embodiment of this invention, session data is backed up on only a limited set of servers, as determined by the failover algorithm. The load balancer routes all traffic for a single session to a single host. This host has the most up-to-date information about the session because it stores the information locally. When session data is written, it is first written to the memory of the primary server and then backed up to at least one other server, maybe more depending upon the configuration of the session manager. In case of failure of the primary server, the load balancer follows the same algorithm as the session manager to choose the backup server as the new primary server.

At any given time, the session information is stored on the primary server and at least one backup server. For any given primary server, the backup server is chosen on a per-session basis. This mechanism ensures that the backup load is distributed evenly across all servers.

Failover Algorithm for Session Management

Figure 2:
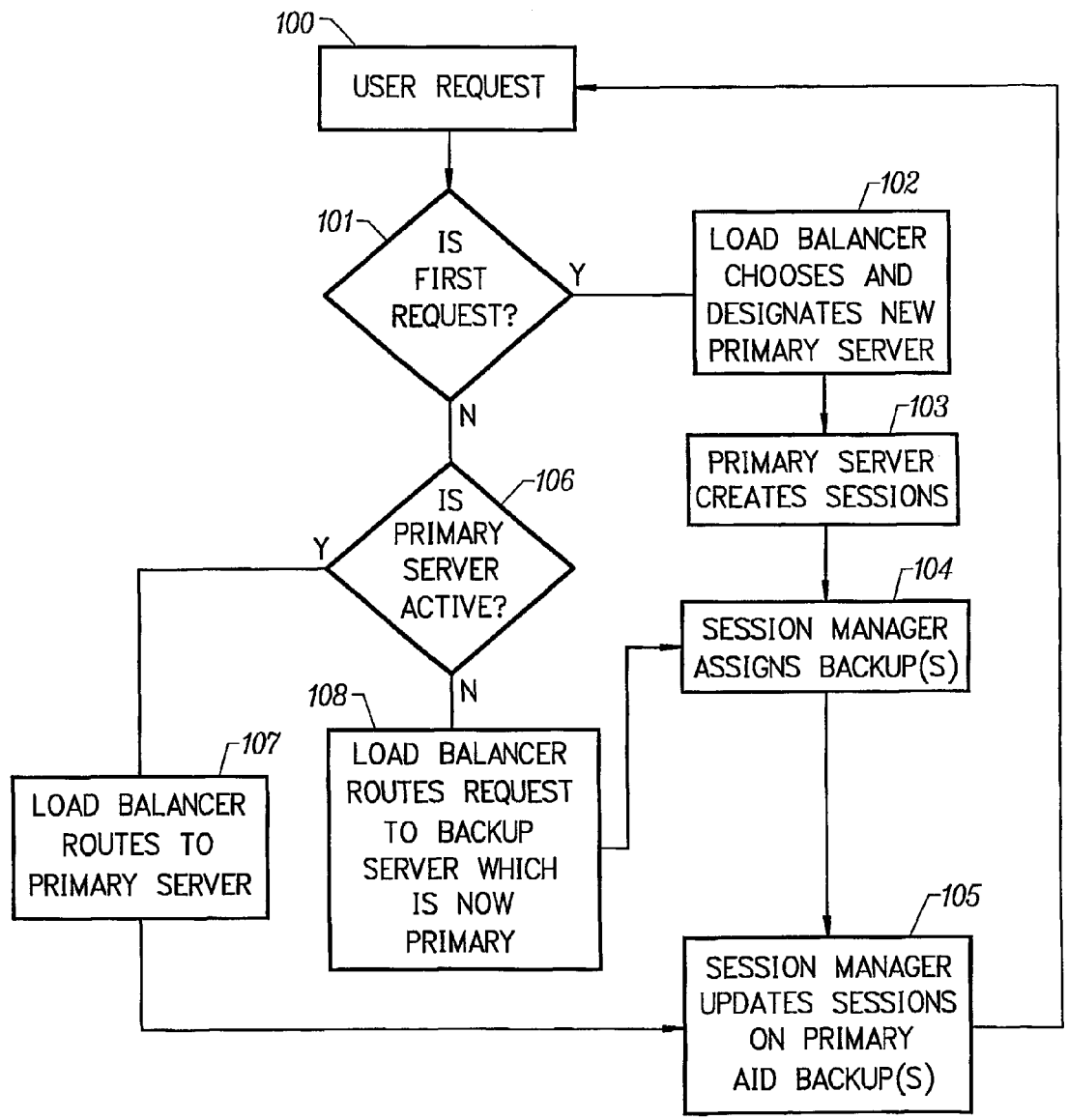
FIG. 2 is a flow diagram that illustrates the failover algorithm for session management on a network.

FIG. 2 is a flow diagram that illustrates the failover algorithm for session management. According to the preferred embodiment of this invention, when the user makes a request (100), if it is the first request, then the user is routed to a server via the load balancer and that server is designated to continue serving that user's request and is called the primary server (102). This assignment of a user to a server is called "stickiness."

The primary server assigned to the user then creates a session and assigns backup server(s) for that session. The session data is updated with the request data from the user (103) and the data is copied to the backup server(s) (104).

During subsequent requests from the user to the system (100), if the primary server has not failed (106), then the request is routed to the primary server and the session data is updated and backed up normally (105). If the primary server has failed (106), the load balancer designates the backup server as the primary (107). The primary server then designates backup servers for the retrieved session. The request information is then stored in the session and backed up on the backup servers (109).

Backup and Failover Load Distribution

According to the preferred embodiment of this invention, on failure of the primary server, all sessions handled by that server should be evenly distributed amongst the remaining servers. Further, the backup algorithm must also spread the load evenly among the other servers.

In a two server scenario, server A is designated as the primary server for half of the sessions. Server B is designated as the backup for all of Server A's sessions. Server A is designated as backup for all of Server B's sessions. Thus, server A must handle half of the load as primary server, as well as backing up half of the total sessions. When server A fails, all sessions are routed to server B, which must handle the full load as primary server.

In a three server scenario, server A, B, and C, each are designated as the primary server for one-third of the total sessions. Servers A, B, and C, each must also act as the backup for each other, giving each of them, the responsibility to back up one-third of the total user sessions. For example, server A must handle half of the backups for server B and half of the backups for server C, each of which have one third of the total session load. Thus, each server handles an equal amount of load as primary server as backup server.

Similarly, with 100 servers, each server handles $1/100$ (1%) of the load as primary server, and each also handles $1/99$ of the backups for 99 other servers. The total backup load for any server is then 1% of the total user sessions.

An object and advantage of this invention is that this solution is very scalable. An increase in the number of servers on the network does not cause a proportional increase in the backup overload on the individual servers on the network because any one server on the network is only responsible for backing up a fraction of the total number of sessions from the load of every other server.

On server failure, backups of the sessions are distributed among the remaining servers. No one server is loaded more than any other, each taking the load of an equal percent of the sessions from the failed server.

An object and advantage of this invention is that there is no single point of failure on this scheme of session management. In case any one of the servers fails on a network fails, the backup machine assumes the functions of the primary server and another server takes over as the backup server. So at any given point of time there are at least two servers (or more) that have the most recent data regarding the session.

Server performance under this solution is very high. The sessions are stored locally on each primary server and the backup server(s). Also, for a particular session, data is only backed up to a limited number of servers, all from the primary unlike in the case of NAS. On failure, the session does not need to be retrieved from any backup since the backup server is automatically chosen as the new primary server.

Thus, the present invention reduces the disadvantages affecting the other session management systems such as NAS and NES and proves to be a more effective tool for session management and is a highly performant, scalable and reliable solution.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A computer implemented method for managing user session load in a network of servers, the method comprising the steps of:

assigning a plurality of servers as primary host servers;

assigning to each one of the primary host servers an equal portion of the user session load;

assigning each one of the primary host servers as a backup server for a rest of the primary host servers, such that each primary host server simultaneously functions as both a primary host server maintaining current session information for its assigned session load and as a backup server for each of said rest of the primary host servers, maintaining current session information for the session loads of each of said rest of the primary host servers;

as user session information for each user session is received, maintaining user session information for each user session on both the primary host servers to which that user session is assigned and on each of said backup servers for that primary host server, such that both said primary host servers and said backup servers simultaneously store and maintain current user session information; and responsive to one of the primary host servers failing, distributing the user session load of the failed primary host server equally on said rest of the primary host servers, which, in their simultaneous capacity as backup servers, have already stored current user session information for the session load of the failed primary host server.

2. A computer implemented method for managing user session load in a network of servers, the method comprising the steps of:

assigning a plurality of servers as primary host servers;

assigning to each one of the primary host servers a portion of the user session load;

assigning each one of the primary host servers as a backup server for a plurality of a rest of the primary host servers, such that each primary host server simultaneously functions as both a primary host server maintaining current session information for its assigned session load and as a backup server for the plurality of the rest of the primary host servers, maintaining current session information for the session loads of each of the plurality of the rest of the primary host servers;

as user session information for each user session is received, maintaining user session information for each user session on both the primary host servers to which that user session is assigned and on each of said backup servers for that primary host server, such that both said primary host servers and said backup servers simultaneously store and maintain current user session information; and responsive to one of the primary host servers failing, distributing the user session load of the failed primary host server on the plurality of the rest of the primary host servers, which, in their simultaneous capacity as corresponding backup servers, have already stored current user session information for the session load of the failed primary host server.

3. The method of claim 2, wherein the step of assigning to each one of the primary host servers includes assigning to each one of the primary host servers an equal portion of the user session load.

4. The method of claim 2, wherein the step of assigning each one of the primary host servers as a backup server includes assigning each one of the primary host servers as a backup server for the rest of the primary host servers.

5. The method of claim 2, wherein the distributing step includes distributing the corresponding portion of the user session load equally on the backup servers, which maintain current user session information.

6. A computer system for managing user session load in a network of servers, the computer system comprising:
- means for assigning a plurality of servers as primary host servers;
- means for assigning to each one of the primary host servers an equal portion of the user session load;
- means for assigning each one of the primary host servers as a backup server for a rest of the primary host servers, such that each primary host server simultaneously functions as both a primary host server maintaining current session information for its assigned session load and as a backup server for each of said rest of the primary host servers, maintaining current session information for the session loads of each of said rest of the primary host servers;
- means for maintaining user session information for each user session is received, maintaining user session information for each user session on both the primary host servers to which that user session is assigned and on each of said backup servers for that primary host server, such that both said primary host servers and said backup servers simultaneously store and maintain current user session information; and
- means for, responsive to one of the primary host servers failing, distributing the user session load of the failed primary host server equally on said rest of the primary host servers, which, in their simultaneous capacity as backup servers, have already stored current user session information for the session load of the failed primary host server.

7. At least one computer readable medium containing a computer program product for managing user session load in a network of servers, the computer program product comprising:
- program code for assigning a plurality of servers as primary host servers;
- assigning to each one of the primary host servers an equal portion of the user session load;
- program code for assigning each one of the primary host servers as a backup server for a rest of the primary host servers, such that each primary host server simultaneously functions as both a primary host server maintaining current session information for its assigned session load and as a backup server for each of said rest of the primary host servers, maintaining current session information for the session loads of each of said rest of the primary host servers;
- program code for, as user session information for each user session is received, maintaining user session information for each user session on both the primary host servers to which that user session is assigned and on each of said backup servers for that primary host server, such that both said primary host servers and said backup servers simultaneously store and maintain current user session information; and
- program code for, responsive to one of the primary host servers failing, distributing the user session load of the failed primary host server equally on said rest of other primary host servers, which, in their simultaneous capacity as backup servers, have already stored current user session information for the session load of the failed primary host server.

8. An apparatus for managing user session load in a network comprising:
- a database for maintaining user session information; and
- a processor configured for:
- assigning a plurality of servers as primary host servers;
- assigning to each one of the primary host servers an equal portion of the user session load;
- assigning each one of the primary host servers as a backup server for a rest of the primary host servers, such that each primary host servers simultaneously functions as both a primary host server maintaining current session information for its assigned session load and as a backup server for each of said rest of the primary host servers, maintaining current session information for the session loads of each of said rest of the primary host servers;
- as user session information for each user session is received, maintaining user session information for each user session on both the primary host servers to which that user session is assigned and on each of said backup servers for that primary host server, such that both said primary host servers and said backup servers simultaneously store and maintain current user session information; and
- responsive to one of the primary host servers failing, distributing the user session load of the failed primary host server equally on said rest of the primary host servers, which, in their simultaneous capacity as backup servers, have already stored current user session information for the session load of the failed primary host server.

* * * * *